(12) United States Patent
Heo et al.

(10) Patent No.: US 9,857,535 B2
(45) Date of Patent: Jan. 2, 2018

(54) METHOD OF PACKAGING MULTICHANNEL OPTICAL RECEIVER MODULE HAVING A SUB-MOUNT WITH AN OPTICAL BLOCK TO GUIDE INCIDENT PARALLEL LIGHT BEAMS AND PACKAGE OF THE SAME

(71) Applicant: ELECTRONICS AND TELECOMMUNICATIONS RESEARCH INSTITUTE, Daejeon (KR)

(72) Inventors: Young Soon Heo, Gwangju (KR); Hyun Seo Kang, Gwangju (KR); Keo Sik Kim, Gwangju (KR); Jeong Eun Kim, Gwangju (KR); Ji Hyoung Ryu, Jeonju (KR); Hyoung Jun Park, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 108 days.

(21) Appl. No.: 15/096,171

(22) Filed: Apr. 11, 2016

(65) Prior Publication Data

US 2017/0123158 A1    May 4, 2017

(30) Foreign Application Priority Data

Nov. 3, 2015 (KR) .......................... 10-2015-0153970
Dec. 22, 2015 (KR) .......................... 10-2015-0183554

(51) Int. Cl.
  *G02B 6/42* (2006.01)
  *G02B 6/293* (2006.01)
  *G02B 6/32* (2006.01)

(52) U.S. Cl.
  CPC ....... *G02B 6/29367* (2013.01); *G02B 6/2938* (2013.01); *G02B 6/32* (2013.01);
  (Continued)

(58) Field of Classification Search
  CPC ................ G02B 6/2936; G02B 6/2938; G02B 27/1006; G02B 6/32; G02B 6/4221; G02B 6/4246
  (Continued)

(56) References Cited

U.S. PATENT DOCUMENTS 5,118,926 A * 6/1992 Gerstch .............. G02B 27/1006
                                                              250/226
7,218,806 B2   5/2007 Han et al.
(Continued)

FOREIGN PATENT DOCUMENTS

JP        5439191 B2     3/2014
KR   10-1047121 B1       7/2011
(Continued)

*Primary Examiner* — Que T Le

(57) ABSTRACT

A method of packaging a multi-channel optical receiver module and a package of the same are provided. The method includes installing a first lens on a sub-mount; aligning an optical block including a plurality of filters on the sub-mount; installing the aligned optical block on the sub-mount; aligning a second lens on the sub-mount; installing the aligned second lens on the sub-mount; and coupling the sub-mount to a TO-stem. The aligning of the optical block transmits light incident through the first lens to the plurality of filters, transmits light beams transmitted through the plurality of filters to an object lens, monitors positions of and intervals between the light beams transmitted through an infrared (IR) camera and aligns the optical block so that the intervals between the light beams transmitted through the plurality of filters are identical.

9 Claims, 6 Drawing Sheets

(52) U.S. Cl.
CPC ......... *G02B 6/4208* (2013.01); *G02B 6/4221* (2013.01); *G02B 6/4227* (2013.01); *G02B 6/4263* (2013.01)

(58) Field of Classification Search
USPC ........................................ 250/551, 216, 239
See application file for complete search history.

(56) References Cited

U.S. PATENT DOCUMENTS

| | | |
|---|---|---|
| 8,303,195 B2 | 11/2012 | Adachi et al. |
| 8,355,612 B2 | 1/2013 | Kang et al. |
| 8,540,437 B2 | 9/2013 | Lee et al. |
| 8,926,198 B2 | 1/2015 | Park et al. |
| 9,081,157 B2 | 7/2015 | Shin |
| 2006/0088255 A1 | 4/2006 | Wu et al. |
| 2014/0147131 A1 | 5/2014 | Kim |
| 2014/0341578 A1 | 11/2014 | Ho et al. |

FOREIGN PATENT DOCUMENTS

| | | |
|---|---|---|
| KR | 10-1144665 B1 | 5/2012 |
| KR | 10-1362406 B1 | 2/2014 |

\* cited by examiner

METHOD OF PACKAGING MULTICHANNEL OPTICAL RECEIVER MODULE HAVING A SUB-MOUNT WITH AN OPTICAL BLOCK TO GUIDE INCIDENT PARALLEL LIGHT BEAMS AND PACKAGE OF THE SAME

CROSS-REFERENCE TO RELATED APPLICATION

This application claims priority to and the benefit of Korean Patent Application No. 10-2015-0153970, filed on Nov. 3, 2015 and Korean Patent Application No. 10-2015-0183554, filed on Dec. 22, 2015 and the disclosure of which is incorporated herein by reference in its entirety.

BACKGROUND

1. Field of the Invention

The present invention relates to a method of packaging a multi-channel optical receiver module and a package of the same.

2. Discussion of Related Art

A method of transmitting optical signals having wavelengths different from each other to one optical fiber by performing a wavelength division multiplexing (WDM) on the optical signals is being used as technology for transmitting high-quality and large-capacity data traffic. The WDM method is an optical multiplexing method of transmitting various wavelength bands simultaneously, can transmit a variety of transmission information through one optical fiber, and has a transmission capacity which is equal to or more than 40 Gbps.

Meanwhile, the WDM method may be divided into a coarse WDM (CWDM) and a dense WDM (DWDM). In the case of the CWDM has a large wavelength interval of tens of nanometers (nm), has a low cost as the number of usable wavelengths is 4 to 8, and is mainly used for an access network. The DWDM has a wavelength interval of several nm and is mainly used for a medium and long-range transmission.

While the WDM method has been mainly used for a backbone network, the WDM method has been also applied to an access loop network and an Ethernet network.

The CWDM method having four wavelengths is being used as a standard for the Ethernet, and various methods for implementing a four-wavelength transmitter optical sub-assembly (TOSA) and a four-wavelength receiver optical sub-assembly (ROSA) absolutely needed for the CWDM method are being proposed. In this case, the TOSA performs a four-channel electrophotic conversion function and a wavelength multiplexing function, and the ROSA performs a wavelength demultiplexing function and a four-channel photoelectric conversion function.

In an optical transceiver for the Ethernet network, miniaturization and low power consumption of the optical transceiver are needed for lower power consumption and integration of a data center, and optical alignment, packaging, reliability of the optical module embedded in the optical transceiver are very important.

However, conventional arts having various structures are difficult to miniaturize due to a characteristic of their structures and have a problem of a great loss according to an optical alignment. Further, the conventional arts have a problem in that it is difficult to package, and thus mass production is very difficult.

Regarding the conventional arts, United States Patent (USP) Publication No. 2006-0088255 (Title: multi-wavelength optical transceiver subassembly module) discloses technology in which only an optical signal having a corresponding wavelength is transmitted by thin film filters and the optical signals having the remaining wavelengths are reflected when optical signals having various wavelengths are incident to the thin film filters aligned in a pentagon shape through a receptacle.

However, the conventional art has a problem in that it is difficult to miniaturize due to a characteristic of its structure. Further, the conventional art has a problem in that a great loss occurs according to an optical alignment, and it is difficult to package, and thus mass production is difficult.

SUMMARY OF THE INVENTION

The present invention is directed to a method of packaging a multi-channel optical receiver module capable of easily implementing a multi-channel optical module by manually installing a parallel light lens in a separate sub-mount and aligning an optical block and a focusing lens in which a filter is installed by monitoring them using an object lens and an infrared (IR) camera as well as a package of the same.

The technical objects which embodiments of the present invention desire to achieve is not limited to the object described above, and other technical objects may exist.

According to one aspect of the present invention, there is provided a method of packaging a multi-channel optical receiver module, including: installing a first lens on a sub-mount; aligning an optical block including a plurality of filters on the sub-mount; installing the aligned optical block on the sub-mount; aligning a second lens on the sub-mount; installing the aligned second lens on the sub-mount; and coupling the sub-mount to a TO-stem. In this case, the aligning of the optical block transmits light incident through the first lens to the plurality of filters, transmit light beams transmitted through the plurality of filters to an object lens, monitors positions of and intervals between the light beams transmitted through the object lens using an infrared (IR) camera, and aligns the optical block so that the intervals between the light beams transmitted through the plurality of filters are identical.

According to another aspect of the present invention, there is provided an optical receiver module package, including: a TO-stem including a base, a plurality of optical receiver devices installed on the base so that intervals between light beams output through second lens are identical and configured to receive the light beams having wavelengths different from each other, a head portion formed on the base to be inserted into and coupled to a sub-mount, and one or more lead pins configured to penetrate through the base; and the sub-mount including a first lens transmitting light having various wavelengths which are incident as parallel light beams, an optical block configured to guide the parallel light beams, a plurality of filters coupled to the optical block and configured to transmit only a specific wavelength among the guided parallel light beams and reflect the remaining wavelengths, and a second lens aligned to correspond to each of the plurality of optical receiver devices and configured to focus the light beams transmitted through the filters.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
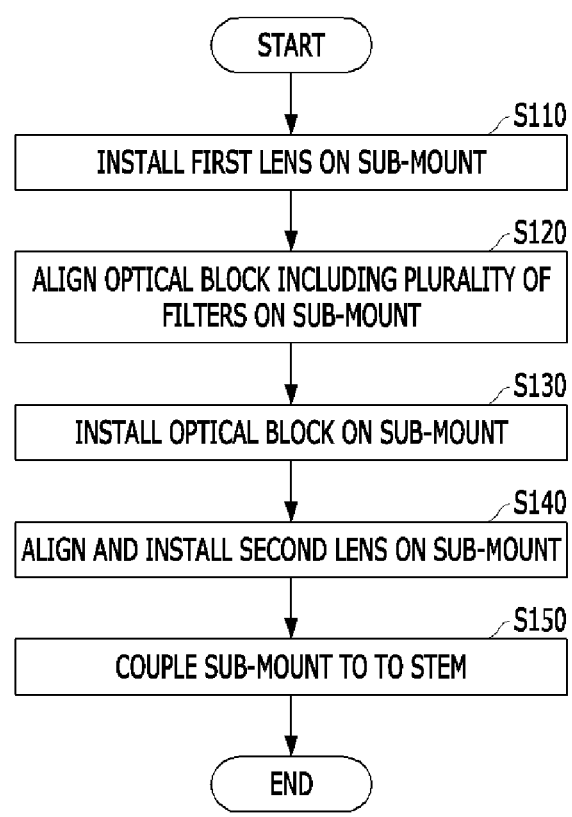
FIG. 1 is a flowchart for describing a method of packaging a multi-channel optical receiver module according to an embodiment of the present invention.

Hereinafter, embodiments of the present invention are described in sufficient detail to enable those of ordinary skill in the art to embody and practice the present invention. However, the present invention is not limited to exemplary embodiments which will be described and can be implemented as various different forms. In order to describe the present invention clearly, a portion which is not related to the description is omitted, and similar reference numerals are given to similar portions in the accompanying drawings throughout this specification.

Throughout this specification, when one portion is "connected" or "coupled" to another portion, it may not only mean a case of directly being connected but also mean a case of being electrically connected by having an intervening device.

Throughout the specification, when one member is located "on" another member, it may not only mean a case where one member is in contact with another member but also mean a case of being connected by having an intervening member.

Throughout the specification, it will be further understood that the terms "comprises," "comprising," "includes," and/or "including," when used herein specify the presence of stated features, items, steps, operations, elements, and/or components and do not preclude the presence or addition of one or more other features, items, steps, operations, elements, components, and/or groups thereof. The terms "about", "substantially", etc. representing an extent used throughout this specification are used to mean a value or a value approximate to the value when a specific manufacturing material or tolerance is proposed for a mentioned meaning and in order to help the understanding of the present invention, the terms are used for preventing an unscrupulous infringer from wrongfully using a disclosure in which a precise or absolute value is described. The terms "step~" or "step of~" which are used to indicate a level or extent used throughout this specification do not mean "step for~".

The present invention relates to a method of packaging a multi-channel optical receiver module and a package of the same 1.

Hereinafter, a method of packaging a multi-channel optical receiver module according to an embodiment of the present invention will be described in detail with reference to FIGS. 1 to 5.

Figure 2:
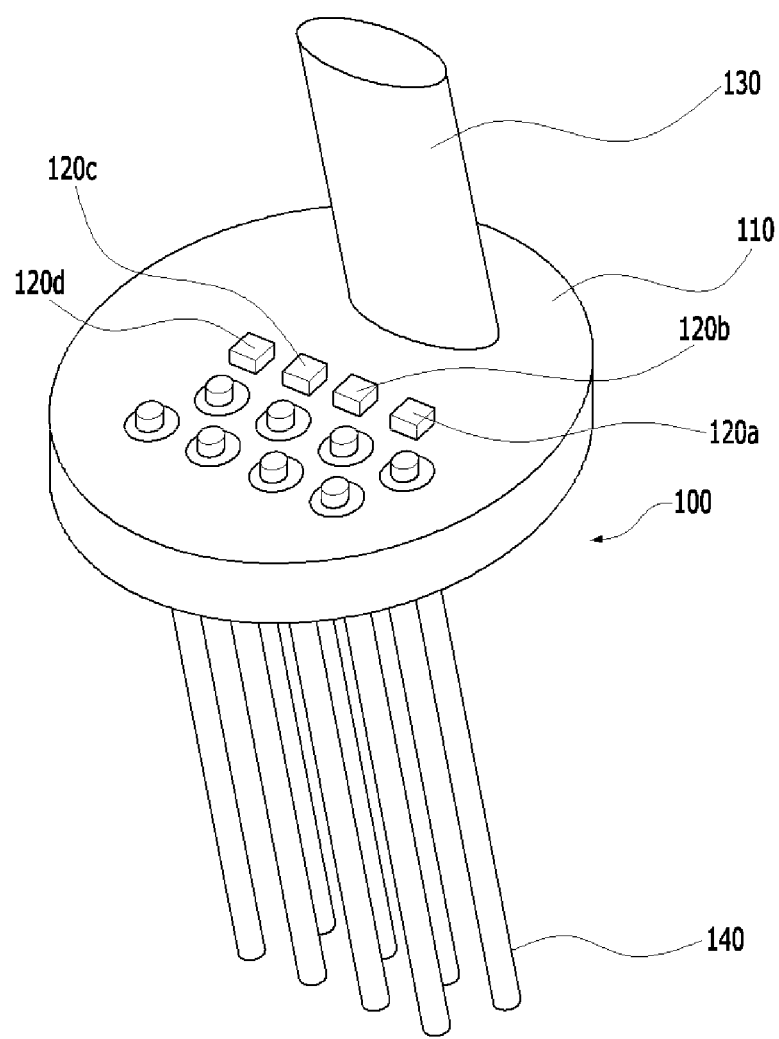
FIG. 2 is a diagram illustrating a TO-stem according to an embodiment of the present invention.
Figure 3A:
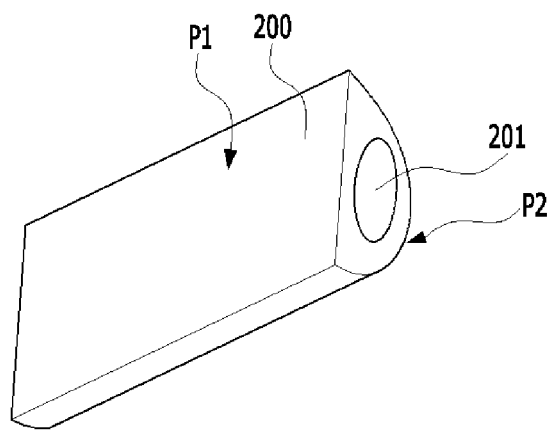
FIG. 3A is a perspective of a sub-mount according to an embodiment of the present invention.
Figure 3B:
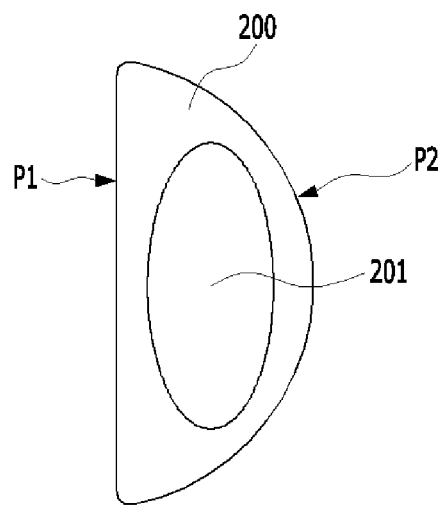
FIG. 3B is a plan view of a sub-mount according to an embodiment of the present invention.
Figure 4:
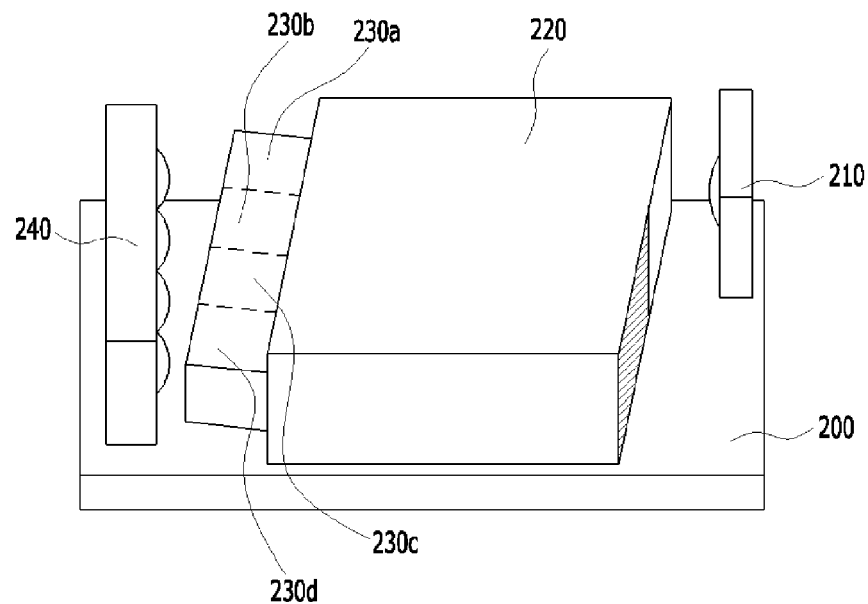
FIG. 4 is a diagram illustrating a sub-mount in which first and second lenses, an optical block, and a filter are installed.
Figure 5:
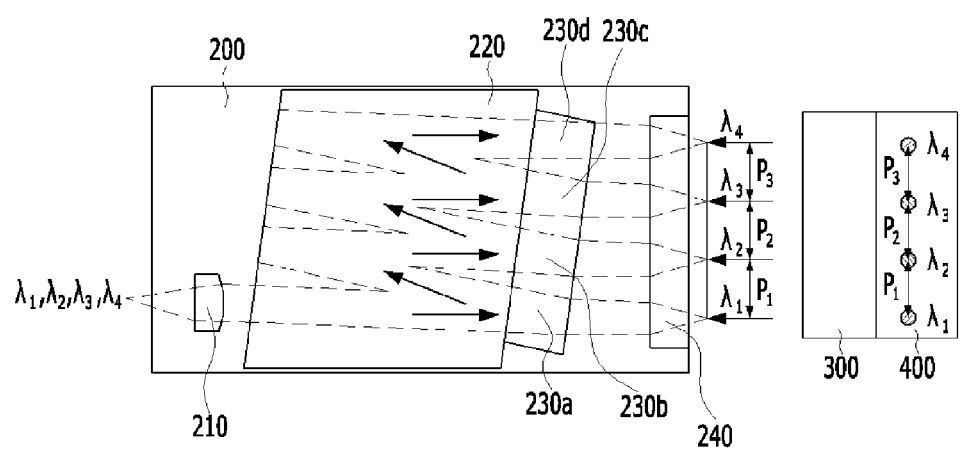
FIG. 5 is a diagram for describing a method of aligning the first and second lenses.

FIG. 1 is a flowchart for describing a method of packaging a multi-channel optical receiver module according to an embodiment of the present invention. FIG. 2 is a diagram illustrating a TO-stem 100 according to an embodiment of the present invention. FIG. 3 is a diagram illustrating a sub-mount 200 according to an embodiment of the present invention. FIG. 4 is a diagram illustrating the sub-mount 200 in which first and second lenses 210 and 240, an optical block 220, and filters 230a, 230b, 230c, and 230d are installed. FIG. 5 is a diagram for describing a method of aligning the first and second lenses.

First, the method of packaging the multi-channel optical receiver module according to an embodiment of the present invention may install the first lens 210 on the sub-mount 200 (S110). In this case, the first lens 210 may be installed on the sub-mount 200 using ultraviolet (UV) epoxy.

Referring to FIGS. 3 and 4, one side P1 of the sub-mount 200 according to an embodiment of the present invention may be formed to be flat, and the other side P2 may be formed to have a round semicircular shape. A hole 201 penetrating through the sub-mount 200 from one end surface to the other end surface of the sub-mount 200 may be formed.

The first lens 210 may be installed on the sub-mount 200. In this case, the first lens 210 may be located at an upper portion of the sub-mount 200 and receive light having four wavelengths.

Next, after the plurality of filters 230a, 230b, 230c, and 230d are installed on one side of the optical block 220 using the UV epoxy, the optical block 220 including the plurality of filters 230a, 230b, 230c, and 230d may be aligned on the sub-mount 200 (S120). In this case, a remaining portion excluding a portion having a size corresponding to the first lens 210 on the other side of the optical block 220 may be coated to be totally reflected 221.

Preferably, the optical block 220 may receive the light incident through the first lens 210 which will be described below, and the filters 230a, 230b, 230c, and 230d may be attached to the optical block 220 and be aligned in a center portion on the sub-mount 200 so that the light received to the second lens 240 is output.

For this, the optical block 220 may transmit the light incident through the first lens 210 and transmitted through the plurality of filters 230a, 230b, 230c, and 230d to the object lens 300. Positions of the light beams and intervals between the light beams transmitted to the object lens 300 may be monitored through an infrared (IR) camera 400, and thus the optical block 220 may be aligned so that the intervals between the light beams transmitted through the plurality of filters 230a, 230b, 230c, and 230d are identical.

Referring to FIGS. 4 and 5, after the first lens 210 is installed on the sub-mount 200, the light passing through the first lens 210 may be aligned to be incident to the optical block 220. The lights transmitted through the plurality of filters 230a, 230b, 230c, and 230d may be passed through the object lens 330.

Next, the optical block 220 may be aligned so that the intervals between the light beams transmitted through the plurality of filters 230a, 230b, 230c, and 230d are identical by monitoring the positions of the light beams and the intervals between the light beams passing through the object lens 300 using the IR camera 400.

In this case, by monitoring through the IR camera 400, the optical block 220 may be aligned so that the intervals between the light beams transmitted through the plurality of filters 230a, 230b, 230c, and 230d are identical S1=S2=S3.

That is, the optical block 220 may be aligned so that the intervals between the light beams monitored through the IR camera 400 are identical S1=S2=S3, and thus the intervals between the light beams transmitted through the plurality of filters 230a, 230b, 230c, and 230d may be identical $P_1=P_2=P_3$.

Next, the optical block 220 aligned as described above may be installed on the sub-mount 200 (S130).

In this case, the optical block 220 may be installed on the sub-mount 200 using the UV epoxy.

After installing the optical block 220 on the sub-mount 200, the second lens 240 configured in an array form may be aligned on the sub-mount 200 (S140).

In this case, the second lens 240 may be located at a lower portion of the sub-mount 200 so that the light beams are maximally and optically coupled to the optical receiver devices 120a, 120b, 120c, and 120d, and thus receive the light beams transmitted through the optical block 220 and the filters 230a, 230b, 230c, and 230d.

In addition, the second lens 240 may be aligned using an alignment jig so that each of the light beams transmitted through the plurality of filters 230a, 230b, 230c, and 230d is incident to the center portion of the second lens 240. In this case, in order to confirm that each of the lights transmitted through the plurality of filters 230a, 230b, 230c, and 230d is incident to the center of the second lens 240, the object lens 300 and the IR camera 400 may be used for aligning the optical block 220 instead of the alignment jig.

Next, the second lens 240 aligned as described above is installed on the sub-mount 200 (S140). In this case, the second lens 240 may be installed on the sub-mount 200 using the UV epoxy like the first lens 210.

Meanwhile, in an embodiment of the present invention, the first lens 210 may be a collimating lens, and the second lens 240 may be a coupling lens.

Next, the sub-mount 200 in which the optical block 220, the first lens 210, and the second lens 240 are installed may be coupled to the TO-stem 100 (S150).

The hole 201 may be formed to penetrate through the sub-mount 200 from one end surface to the other end surface of the sub-mount 200. Also, the TO-stem 100 may include a head portion 130 formed to correspond to the hole 201 of the sub-mount 200. Accordingly, the TO-stem 100 and the sub-mount 200 may be coupled by inserting the head portion 130 of the TO-stem 100 into the hole 201 of the sub-mount 200.

In this case, the hole 201 of the sub-mount 200 in which the head portion 130 of the TO-stem 100 is inserted may be sealed without gaps using epoxy. That is, after inserting the sub-mount 200 in which the hole 201 is formed into the head portion 130 of the TO-stem 100, and minutely aligning so that optical coupling efficiency of the optical receiver devices 120a, 120b, 120c, and 120d is maximized by being the light incident to the first lens 210, the hole 201 may be completely filled and sealed using with the epoxy. Accordingly, the alignment may not be disturbed even when an external environment such as a temperature is changed.

Hereinafter, with reference to FIGS. 6 and 7, a multi-channel optical receiver module package 1 according to an embodiment of the present invention will be described.

Figure 6:
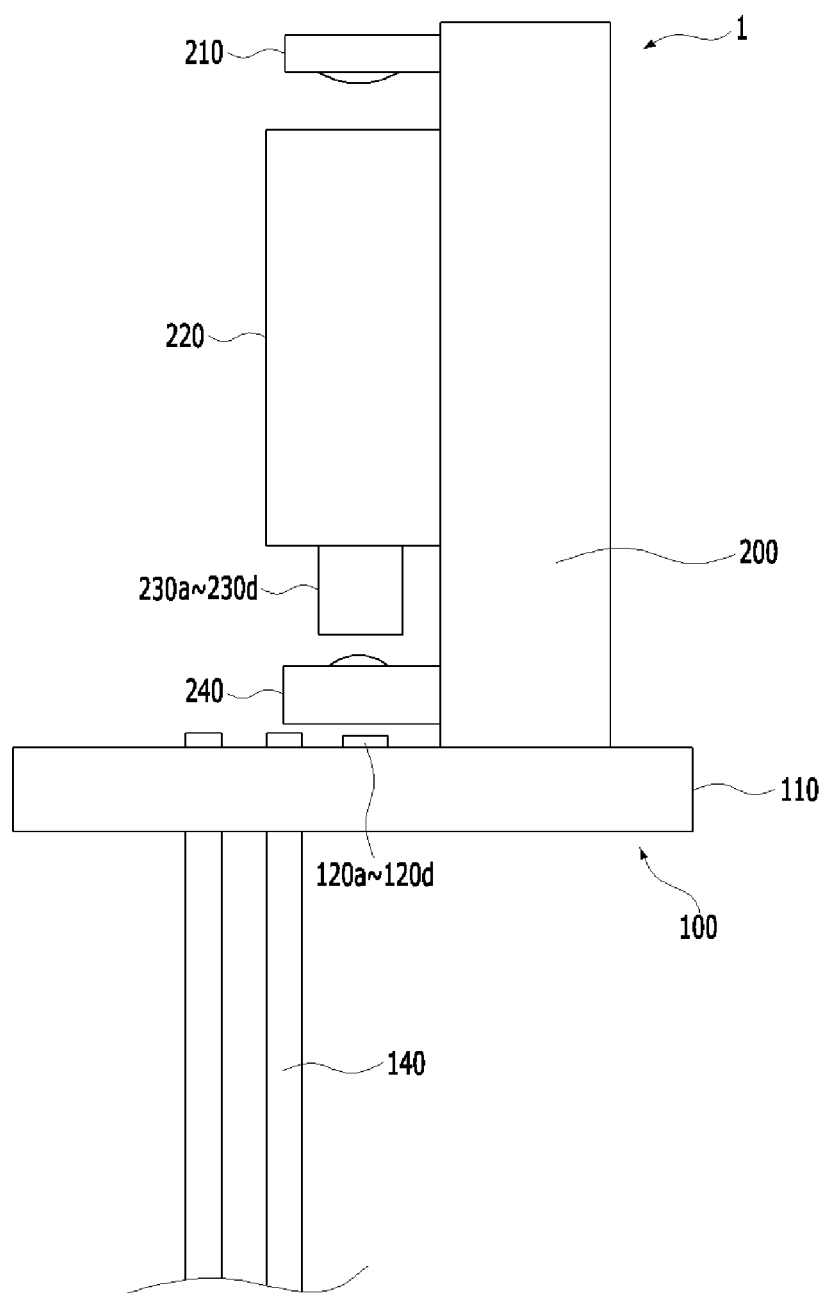
FIG. 6 is a side view of an optical receiver module package according to an embodiment of the present invention.
Figure 7:
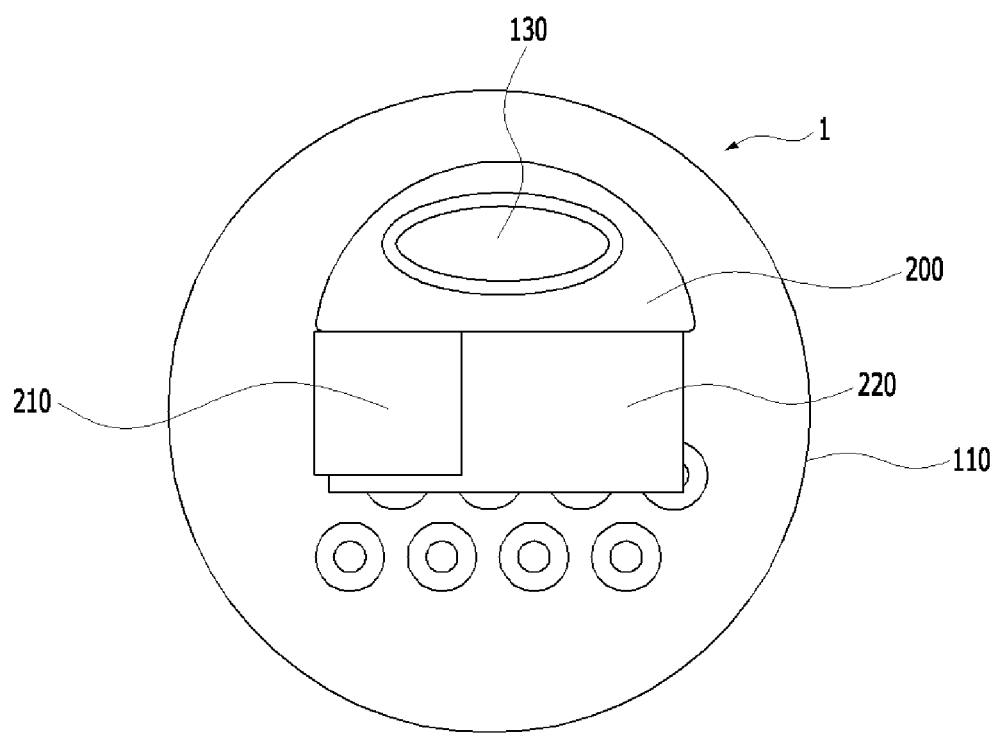
FIG. 7 is a plan view of an optical receiver module package according to an embodiment of the present invention.

FIG. 6 is a side view of an optical receiver module package 1 according to an embodiment of the present invention. FIG. 7 is a plan view of the optical receiver module package 1 according to an embodiment of the present invention.

The optical receiver module package 1 according to an embodiment of the present invention may include a TO-stem 100 and a sub-mount 200.

The TO-stem 100 may include a base 110, a plurality of optical receiver devices 120a, 120b, 120c, and 120d, a head portion 130, and a lead pin 140. The base 110 may be formed to include the plurality of optical receiver devices 120a, 120b, 120c, and 120d, the head portion 130, and the lead pin 140, and in an embodiment, may have a circular shape as shown in FIG. 6.

The plurality of optical receiver devices 120a, 120b, 120c, and 120d receive the lights output through the second lens 240, respectively, and be aligned on the base 110 so that the intervals between the light beams output through the second lens 240 are identical. Also, the plurality of optical receiver devices 120a, 120b, 120c, and 120d receive light beams having wavelengths different from each other, respectively.

In this case, the number of optical receiver devices 120a, 120b, 120c, and 120d may be the same as the number of wavelengths of the light incident to the first lens 210. For example, when light having four wavelengths $\lambda_1, \lambda_2, \lambda_3, \lambda_4$ is incident, four optical receiver devices 120a, 120b, 120c, and 120d may be included.

Further, the optical receiver devices 120a, 120b, 120c, and 120d may receive optical signals having wavelengths different from each other, respectively. Meanwhile, the optical receiver devices 120a, 120b, 120c, and 120d may be configured as photo diodes receiving the optical signals having wavelengths $\lambda_1, \lambda_2, \lambda_3$, and $\lambda_4$ different from each other.

The head portion 130 may be formed on the base 110 to be inserted into and coupled to the sub-mount 200.

In this case, the head portion 130 may be formed to have a shape corresponding to the shape of the hole 201 to be inserted into the hole 201 formed in the sub-mount 200. For example, shapes of the hole 201 and the head portion 130 may be oval shapes.

The lead pin 140 may be formed to penetrate through the base 110 in the opposite direction of the head portion 130. A wire bonding operation may be performed between the optical receiver devices 120a, 120b, 120c, and 120d and the lead pin 140 in order to apply power to the optical receiver devices 120a, 120b, 120c, and 120d.

The sub-mount 200 may include a first lens 210, an optical block 220, a plurality of filters 230a, 230b, 230c, and 230d, and a second lens 240 configured in an array form.

The first lens 210 may transmit the light having various wavelengths which is incident to the first lens 210 as parallel light beams. In this case, in an embodiment of the present invention, the first lens 210 may be a collimating lens.

The optical block 220 may guide the parallel light beams.

The optical block 220 may include a transparent body, an anti-reflective layer and a total reflection layer 221. In detail, the total reflection layer 221 may be formed by being coated on the remaining portion after excluding a portion having a size corresponding to the first lens 210 at the other side which is opposite to the one side of the optical block 220 at which the plurality of filters 230a, 230b, 230c, and 230d are formed.

The total reflection layer 221 formed as described above may totally reflect the light, which is reflected by the first filter among the plurality of filters 230a, 230b, 230c, and 230d, to the second filter.

Accordingly, the second filter may transmit only a specific wavelength in the totally reflected light, and reflect light having the remaining wavelengths to the total reflection layer 221 of the optical block 220.

The plurality of filters 230a, 230b, 230c, and 230d transmit only a specific wavelength among the parallel light beams guided by the optical block 220 and reflect the remaining wavelengths. For this, the plurality of filters 230a, 230b, 230c, and 230d may have constant incident angles, respectively, and the light beams transmitted through the filters 230a, 230b, 230c, and 230d may be incident to the second lens 240.

For example, the first filter 230a may transmit only the light having the first wavelength $\lambda_1$ in the light having various wavelengths $\lambda_1$, $\lambda_2$, $\lambda_3$ and $\lambda_4$ and reflect the light having the remaining wavelengths $\lambda_2$, $\lambda_3$ and $\lambda_4$. The second filter 230b may transmit only the light having the second wavelength $\lambda_2$ in the totally reflected light, and reflect the light having the remaining wavelengths $\lambda_3$ and $\lambda_4$.

The second lens 240 may be formed in an array form and focus the light beams transmitted through the filters 230a, 230b, 230c, and 230d. That is, the light beams having wavelengths $\lambda_1$, $\lambda_2$, $\lambda_3$ and $\lambda_4$ different from each other transmitted through the filters 230a, 230b, 230c, and 230d, respectively, may be received and focused. In this case, in an embodiment of the present invention, the second lens 240 may be a coupling lens.

One side of the sub-mount 200 including the configuration described above may be formed to be flat, and the other end of the sub-mount 200 may be formed to have a round semicircular shape. In one end surface and the other end surface of the sub-mount 200, the hole 201 penetrating through the sub-mount 200 from one end surface to the other end surface of the sub-mount 200 may be formed.

Further, the head portion 130 formed in the TO-stem 100 may be formed to have a oval shape that is identical to that of the hole 201. Accordingly, as the head portion 130 may be inserted into the hole 201 and the hole 201 is sealed with the epoxy, the sub-mount 200 and the TO-stem 100 may be coupled to each other.

Moreover, the shape of the hole 201 of the sub-mount 200 and the shape of the head portion 130 coupled to the hole 201 are not limited to above described and may have various shapes including triangular, square, circular shapes, etc. to facilitate the coupling.

As described above, operations (S110) to (S150) may be further divided to have the increased number of operations or be combined to have the decreased number of operations according to an implementation example of the present invention. Further, some operations may be omitted as needed, and the order between the operations may be changed. Moreover, although omitted, the content of the multi-channel optical receiver module package 1 already described with respect to FIGS. 6 and 7 may be applied to the method of packaging the multi-channel optical receiver module shown in FIGS. 1 to 5.

According to an embodiment of the present invention described above, since an optical system and the optical receiver devices 120a, 120b, 120c, and 120d are separately packaged during packaging, an entire module may not need to be discarded when a problem occurs in any one portion, and thus a manufacturing cost of the optical receiver module may be decreased.

Further, when coupling the sub-mount 200 and the TO-stem 100, there is an advantage in that the alignment may not be disturbed by a change in an external environment such as temperature since the hole 201 formed in the sub-mount 200 is sealed with the epoxy.

The above-described embodiments of the present invention are merely examples, and it will be apparent to those skilled in the art that various modifications can be made to the above-described embodiments of the present invention without departing from the spirit or the scope of the invention. Accordingly, it should be understood that the embodiments of the present invention are not intended to limit the scope of the invention but to describe the invention in all aspects. For example, each component described in a single form may be implemented in a distributed form, and similarly, components described in the distributed form may be implemented in a combined form.

The scope of the present invention is defined by the appended claims, and it is intended that the present invention covers all such modifications provided they come within the scope of the appended claims and their equivalents.

What is claimed is:

1. A method of packaging a multi-channel optical receiver module, comprising:
    installing a first lens on a sub-mount;
    aligning an optical block including a plurality of filters on the sub-mount;
    installing the aligned optical block on the sub-mount;
    aligning a second lens on the sub-mount;
    installing the aligned second lens on the sub-mount; and
    coupling the sub-mount to a TO-stem,
    wherein the aligning of the optical block transmits light incident through the first lens to the plurality of filters, transmits light beams transmitted through the plurality of filters to an object lens, monitors positions of and intervals between the light beams transmitted through the object lens using an infrared (IR) camera, and aligns the optical block so that the intervals between the light beams transmitted through the plurality of filters are identical.

2. The method of claim 1, wherein the aligning of the second lens comprises aligning the second lens so that the light beams transmitted through the plurality of filters are incident on the center portion of the second lens.

3. The method of claim 1, wherein the installing of the optical block on the sub-mount and the installing of the first lens and the second lens on the sub-mount comprises installing the optical block, the first lens, and the second lens on the sub-mount using epoxy.

4. The method of claim 1, wherein the coupling of the sub-mount to the TO-stem comprises:
    inserting a head portion of the TO-stem into a hole penetrating through the sub-mount from one side surface to the other side surface of the sub-mount; and
    sealing the hole of the sub-mount into which the head portion of the TO-stem is inserted using the epoxy.

5. An optical receiver module package comprising:
    a TO-stem including a base, a plurality of optical receiver devices installed on the base so that intervals between light beams output through second lens are identical and configured to receive the light beams having wavelengths different from each other, a head portion formed on the base to be inserted into and coupled to sub-mount, and one or more lead pins configured to penetrate through the base; and
    the sub-mount including a first lens transmitting light having various wavelengths which are incident as parallel light beams, an optical block configured to guide the parallel light beams, a plurality of filters coupled to the optical block and configured to transmit only a specific wavelength among the guided parallel light beams and reflect the remaining wavelengths, and a second lens aligned to correspond to each of the plurality of optical receiver devices and configured to focus the light beams transmitted through the filters.

6. The optical receiver module package of claim 5, wherein the first lens is a collimating lens, and the second lens is a coupling lens.

7. The optical receiver module package of claim 5, wherein one side surface of the sub-mount is flat, and the other side surface has a round semicircular shape, and
    a hole penetrating through the sub-mount from one end surface to the other end surface of the sub-mount is formed at the one end surface and the other end surface of the sub-mount.

8. The optical receiver module package of claim 7, wherein the hole and the head portion have oval shapes, and the head portion is inserted into and coupled to the hole.

9. The optical receiver module package of claim 5, wherein the optical block includes a transparent body, an anti-reflective layer, and a total reflection layer, and
    the total reflection layer totally reflects light reflected by the first filter among the plurality of filters to the second filter.

\* \* \* \* \*